Patented Mar. 19, 1946

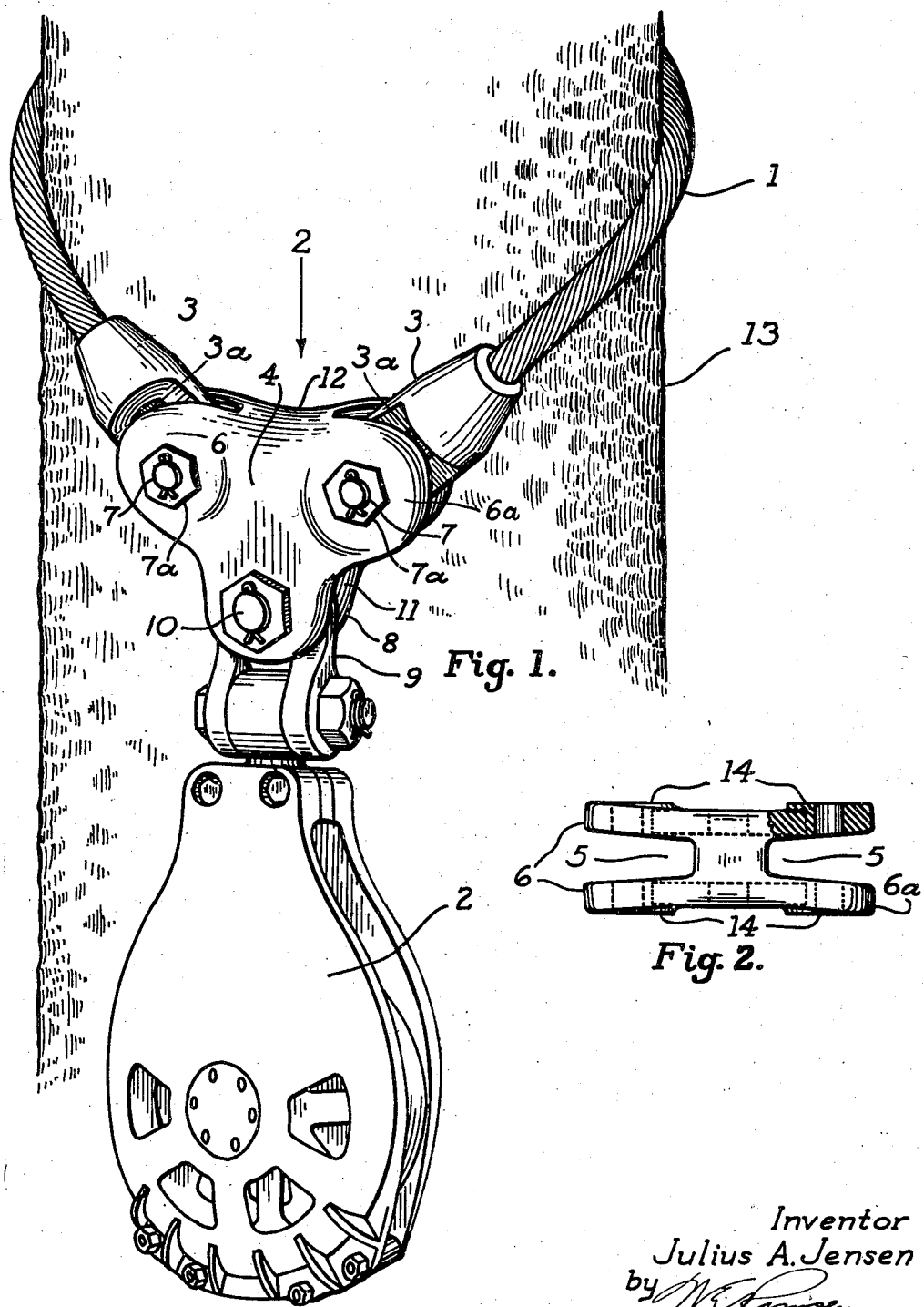

2,396,790

UNITED STATES PATENT OFFICE 2,396,790

LOGGING RIGGING

Julius A. Jensen, Willamina, Oreg.

Application August 7, 1943, Serial No. 497,797

4 Claims. (Cl. 24—123)

The principal object of my invention is to provide a rigging connection for securing a high lead block upon a spar tree or other type of vertical support. Said rigging connection must provide a secure support which may be easily connected and one which will be so articulated as to prevent any binding strain from being produced in use, which would tend to fracture the parts.

A further and more specific object of my invention is to provide a connector element adapted releasably to be secured to the ends of a length of cable or wire rope so that it may be secured to the ends thereof and provided with another connection to which the shackle of a high lead block may be secured. In this manner the length of cable may encircle the spar tree and have its ends joined to two fastening points on such connector element and the high lead connection may be made to a third. It is desirable that such connector element be relatively flat to lie against the side of a spar tree and all connections must be made so that when heavy loads are imposed upon said high lead blocks and the connections therefor, that the parts will not bind to produce fracture.

Further and other details of my invention are hereinafter described with reference to the accompanying drawing, in which:

Fig. 1 is a view showing the rigging connection looped about a spar tree and pendently supporting a high lead block;

Fig. 2 is a plan view of the connector unit with one portion shown broken away to disclose details thereof.

My invention is particularly directed to the provision of a rigging connector element that can be used with a length of cable 1 for supporting a high lead block 2. It is common to provide a length of cable of this character with eyes at the ends thereof such, for example, as sockets 3. If sockets are provided, they are secured to the ends of said cable by being leaded in or expanded so as to form a secure joint. The eyed portion 3a of a socket preferably tapers in thickness from the portion of the middle of said socket towards the extremity thereof. Thus, in such rigging connector element 4, with which my invention is particularly concerned, I provide spaced apertures 5 diverging at an angle, as is shown in Fig. 2, to accommodate the eyed portions of the sockets respectively. This permits a wedging fit for the socket eyes in a connector element.

A rigging connector element 4 embodying my invention preferably is of triangular or cloverleaf pattern as is shown in Fig. 1 and the apertures 5 are arranged at two of the corners and are formed by spaced ears 6 and 6a. Said apertures form the space between said ears and the sockets are pivotally accommodated therein, as is shown in Fig. 1. Extending transversely of said ears is a removable bolt 7, or other type or other types of elongated fastening devices which span the apertures 5 and pass through the eyed portions 3a of a socket. Thus when a nut 7a is secured in place, a secure but articulated connection is formed.

On the remaining corner or lobe of said rigging connector element, similar ears 8 are formed to accommodate a shackle connection 9 for high lead block 2. A bolt 10 extends across the space 11 between said ears 8 and extends through and thus engages the bight of the shackle. The bolts 7 and 10, respectively, all extend in substantial parallelism with each other so that the pivotal connections for the ends of the cable and for a shackle connection for the high lead block are in substantial parallelism to eliminate binding strain. Said rigging connector element preferably is relatively flat and the upper surface 12 is curved so that it will not tend to bite into and chew the surface of a spar tree 13 upon which said rigging connection assembly is to be secured.

It is essential that said rigging connection be adapted to be secured relatively easily because it must be fastened in place by a "high climber," who is a rigging man who has to work many feet up a spar tree and has only his climbing equipment to support him. The high lead connections, including the cable and the connector element are supported while he is fastening them in place, but because of the fact that he is so precariously supported, it is essential that he be able to fit such connections quickly and easily. Said connections preferably are made by looping the length of cable 1 about a spar tree, then securing the two sockets successively into the apertures 5 between ears 6 and 6a, respectively. This is done by removing the bolts, arranging the eared portions of the socket in place and then passing the bolts through the apertures and through the eyed portion 3a of said socket.

The connector element will then hang supported so that a high lead block can be lifted in place and secured by passing a bolt 10 through the shackle so that the high lead block will hang suspended. Then when loading strains are imposed upon the high lead block as suspended, the strains imposed by lifting loads and lateral pulls will be accommodated by the pivoted and bolted connection with the sockets and with the high lead block respectively. It is to be noted that it is desirable that lands or other parallel faces 14 be formed on the exterior of the face of the rigging connector element so that the head and bolt head will pull exactly against one another. That is, inasmuch as the apertures 5 diverge to accommodate the eyed portions 3a of socket 3, it is essential that the outer faces be parallel. This is not necessary for the space between ears 8 because the shackle has to have a relatively loose fit therein so that the high lead block and its shackle will swing freely.

I claim:

1. A rigging connector element for pendently supporting a block, said connector element comprising an integral relatively flat body of triangular contour having pairs of spaced ears formed at the corners thereof, said ears lying in the general plane of said body, and removable fastening devices spanning the space between said pairs of ears, respectively, to constitute articulated securing means for the two ends of a looped section of cable and a shackle connection for a high lead block, respectively.

2. A rigging connector element for pendently supporting a block, said connector element comprising an integral relatively flat body of triangular contour having pairs of spaced ears formed at the corners thereof, said ears lying in the general plane of said body, and removable fastening devices spanning the space between said pairs of ears, respectively, to constitute articulated securing means for the two ends of a looped section of cable and a shackle connection for a high lead block, respectively, said fastening devices being elongated and arranged so that their major axes extend in substantial parallelism with each other.

3. In logging, rigging for hanging a high lead block comprising a length of wire rope having looped eyes arranged at the two ends thereof, a three-way connector element, and a shackle for supporting said high lead block, said connector element being of triangular contour with pairs of spaced ear members arranged at each of the corners of said connector, the ends of said wire rope being joined, respectively, to the connector element between two of said pairs of spaced ear members, and the shackle being secured between the third pair of spaced ears.

4. In logging, rigging for hanging a high lead block comprising a length of wire rope having fastening connections arranged at the two ends thereof, a three-way connector element, and a shackle for supporting said high lead block, said connector elements being of triangular contour with pairs of spaced ear members, provided with releasable articulated fastening elements arranged at each of the corners of said connector, said fastening elements extending transversely of the space between said ear members engaging the two looped eyes and said shackle, respectively, to permit said high lead block to hang more or less pendent from the latter.

JULIUS A. JENSEN.